(12) United States Patent
Pruett et al.

(10) Patent No.: US 8,650,694 B2
(45) Date of Patent: Feb. 18, 2014

(54) SPEED REGULATED PIPELINE PIG

(75) Inventors: Rick D. Pruett, Oologah, OK (US);
Robert F. Strong, Collinsville, OK (US); Eric N. Freeman, Kiefer, OK (US); Charles Culver Gidden Cooper, Arvada, CO (US); Scott Douglas Nelson, Denver, CO (US); Mark Russell Henault, Westminster, CO (US)

(73) Assignee: TDW Delaware, Inc, Wilmington, DE (US)

( * ) Notice: Subject to any disclaimer, the term of this patent is extended or adjusted under 35 U.S.C. 154(b) by 959 days.

(21) Appl. No.: 12/167,664

(22) Filed: Jul. 3, 2008

(65) Prior Publication Data
US 2010/0000037 A1    Jan. 7, 2010

(51) Int. Cl.
*B08B 9/04* (2006.01)
(52) U.S. Cl.
USPC ............... 15/104.061; 15/104.03; 15/104.05
(58) Field of Classification Search
USPC ............... 15/104.061, 104.062, 3.5, 104.03, 15/104.05; 134/166 C, 167 C, 8
See application file for complete search history.

(56) References Cited

U.S. PATENT DOCUMENTS

| | | | | |
|---|---|---|---|---|
| 1,814,752 | A * | 7/1931 | Griffin | 15/104.061 |
| 2,315,133 | A * | 3/1943 | Rincy et al. | 15/104.061 |
| 2,860,356 | A | 11/1958 | Matheny | |
| 3,246,660 | A * | 4/1966 | Hammelmann | 134/167 C |
| 3,275,247 | A * | 9/1966 | Hammelmann | 239/447 |
| 3,495,546 | A | 2/1970 | Brown et al. | |
| 3,702,685 | A * | 11/1972 | Kirschke | 134/167 C |
| 4,173,806 | A * | 11/1979 | Hammelmann | 15/104.061 |
| 4,411,039 | A * | 10/1983 | Timmins et al. | 15/104.061 |
| 4,676,310 | A * | 6/1987 | Scherbatskoy et al. | 340/853.4 |
| 4,720,884 | A | 1/1988 | Ralls | |
| 4,769,598 | A | 9/1988 | Krieg et al. | |
| 5,176,164 | A | 1/1993 | Boyle | |
| 5,208,936 | A | 5/1993 | Campbell | |
| 5,232,196 | A | 8/1993 | Hutchings et al. | |
| 5,875,803 | A * | 3/1999 | Leitko et al. | 134/167 C |
| 6,070,285 | A | 6/2000 | Geppert | |
| 6,098,231 | A | 8/2000 | Smith et al. | |

(Continued)

OTHER PUBLICATIONS

International Preliminary Report on Patentability as issued on Jan. 13, 2011 by the International Bureau of WIPO, Geneva, Switzerland in PCT/US2009/049228.

(Continued)

*Primary Examiner* — Lee D Wilson
*Assistant Examiner* — Joel Crandall
(74) *Attorney, Agent, or Firm* — Gable Gotwals (57) ABSTRACT

A pipeline pig includes a venturi and a modulating valve located rearward of the inlet side of the venturi. When the valve is in the open position, a predetermined maximum bypass flow is allowed through the venturi. The closed position allows a predetermined minimum bypass flow. The valve may be a poppet-style valve or a frusto-conical shaped stopper. The stopper has sufficient mass and/or aerodynamic drag to overcome the spring force holding the valve in the open position. When the pig stalls, the valve closes and the stopper chokes bypass flow through the venturi. When the pig starts running again, the valve opens as inertia forces the stopper away from the inlet side of the venturi. Also, as friction of the pig increases due to changes in the internal diameter of the pipeline or accumulation of debris ahead of the pig, increased airflow across the valve creates drag sufficient to partially overcome the spring force, thus keeping the pig moving at a desirable rate of travel.

16 Claims, 12 Drawing Sheets

(56) References Cited

U.S. PATENT DOCUMENTS

| | | |
|---|---|---|
| 6,190,090 B1 | 2/2001 | Campbell et al. |
| 6,370,721 B1 | 4/2002 | Torres, Jr. et al. |
| 7,000,280 B1 * | 2/2006 | Knapp .................... 15/104.061 |
| 2010/0000037 A1 * | 1/2010 | Pruett et al. .............. 15/104.061 |

OTHER PUBLICATIONS

PCT Patent Office, "Not. of Trans. of Intl. Search Report/Written Opinion of the Intl. Searching Authority," PCT Patent Office, (Aug. 26, 2009).

* cited by examiner

SPEED REGULATED PIPELINE PIG

REFERENCE TO PENDING APPLICATIONS

This application is not based upon any pending domestic or international patent applications.

FIELD OF THE INVENTION

This invention relates generally to a pipeline pig that services a pipeline and moves through the interior of the pipeline by the flow of pressurized gas. More specifically, this invention relates to regulating the speed of the pipeline pig and preventing its stalling in high velocity pipelines.

BACKGROUND OF THE INVENTION

Pipeline pigs for inspecting, servicing, and maintaining pipelines are typically moved along the interior of the pipeline under pressure. Absent any speed control, the pig travels at essentially the same rate of speed as the pipeline fluid propelling it. In many cases, the speed of the pipeline fluid exceeds the desired range in which the pig is most effective for its intended use. In addition, pipeline debris and build-up may slow the pig below a desired minimum speed, thereby requiring means for increasing pig speed. Therefore, various speed control means have been developed. Some are "passive" control devices, using only pressure flow. Others are "active" control devices, using electronics or electrical actuators.

Prior art passive speed control devices may be classified into two broad categories: valve-actuated control devices and passageway-adjusted control devices. Both categories of speed control devices work by altering the amount of bypass flow through the body of the pig. An example of an early valve-actuated control device is disclosed in U.S. Pat. No. 2,860,356. A hollow valve member having a front and rear set of ports is received by a sleeve located at a forward end of the pig. If the pig encounters resistance to its movement and slows, a pressure increase at the rearward end of the pig causes the valve member to move farther into the sleeve, thereby blocking the front ports and reducing flow through the valve and, therefore, increasing bypass flow though the pig. The reduced flow through the valve further increases the pressure differential across the pig and, therefore, the speed of the pig increases. By allowing more bypass flow through the pig when the pig stalls, debris may be flushed out of the way to allow the pig to start again. The valve, however, does not prevent the pig from stalling, nor does it prevent speed surges above that of the pipeline fluid propelling the pig.

Other valve-actuated control devices employ increasingly sophisticated active control means for operating the valve. None of those control means, however, prevent the pig from stalling or controlling speed surges. For example, U.S. Pat. No. 3,495,546 discloses the use of a valve that is opened or closed by a large piston coupled to a solenoid responsive to changes in line pressure. Actuation of the piston moves the valve, thereby controlling the degree of opening in a bypass port. A more sophisticated control means, such as that disclosed in U.S. Pat. No. 6,098,231 places a sleeve-type valve in communication with a microprocessor. The microprocessor monitors pig speed and, when speed falls outside a predetermined range, the microprocessor sends a signal to extend or retract a hydraulic actuator connected to the valve. By controlling the actuator, a portion of the sleeve is drawn over, or removed from, a set of circumferential exit ports, thereby increasing or decreasing flow through the pig.

As to the second category of speed control devices, passageway-adjusted, U.S. Pat. No. 4,769,598 provides a typical example. Two perforated discs rotatable in relation to one another are mounted external to the pig body in an annular space between the front sealing elements. The degree of alignment in the perforations in the two discs permits the speed of the pig to vary by allowing more or less fluid to flow through the interior passageway of the pig. Similar to the above patent is U.S. Pat. No. 6,190,090, which discloses the use of a first and second bonnet. Each bonnet has several openings and is mounted to a forward end of the pig. A stepper motor and controller vary the degrees of alignment in the bonnets and, therefore, regulate bypass flow through the pig.

Another example of an active passageway-adjusted device is found in U.S. Pat. No. 5,208,906, which discloses the use of a set of longitudinal passageways through the interior of the pig and a set of movable plates that adjust the flow through the passageways. The plates are typically adjusted by a step motor and controller which are, in turn, controlled by a comparator circuit that compares the actual speed of the pig with the desired speed.

With the exception of U.S. Pat. No. 2,860,356, all of the above speed control devices rely upon sophisticated control means for either varying the position of the valve or the alignment or size of the passageways to shunt bypass flow. U.S. Pat. No. 2,860,356, however, requires the use of multiple valves in large pigs and in high velocity pipeline applications; therefore, it—along with the other prior alt devices—is not optimized for maximum speed reduction of the pig. Additionally, none of the prior art devices prevent stalling or surging. When the pig stalls, significant pressure may build up behind the pig and cause the pig to surge to speeds even higher than the average fluid flow through the pipeline. This is problematic, for example, in dispersal-type pigs.

A dispersal pig is configured to move fluid (gas and liquid) forward in advance of the pig and includes one or more nozzles located at a forward end of the pig. Differential pressure across the pig allows the gas flow to draw liquid into the nozzle and a spray of liquid is formed and ejected from the nozzle opening. Although the dispersion method generally results in an improved coating application of the interior cylindrical wall of the pipeline, an inability to control the amount of bypass flow, and therefore control the maximum flow rate through the nozzle, erodes the effectiveness of the dispersion. The high velocity of product passing through the nozzle may stall the pig, resulting in pressure buildup behind the pig that causes the pig's speed to surge far above the speed at which it effectively disperses the liquid. Therefore, a need exists for a device to provide maximum speed reduction and prevent stalling and surging of the pig without reliance upon sophisticated control means.

Likewise, in the case of a cleaning type pig, optimum speed for effective cleaning may be significantly slower than the average flow in high-flow pipelines. A large amount of bypass may slow the pig and cause it to stall, especially as debris builds up in front of the pig. This stalling may result in pressure build-up and surging (as described above), resulting in high pig velocity and skating over portions of the debris. Again, a means to minimize the duration of stalling, pressure build-up, and surging is needed.

BRIEF SUMMARY OF THE INVENTION

A pipeline pig made according to this invention has a longitudinal pig body with a forward end, a rearward end, a central passageway, and a plurality of external circumferential seating elements in sealing engagement with a pipeline.

The central passageway includes a venturi preferably concentric to the pig body. The venturi may be provided by a nozzle affixed to the forward end of the pig. A modulating valve, which is also preferably concentric to the pig body, is located rearward of the inlet side of the venturi. The venturi, modulating valve, or both may be non-concentric to the pig body. The modulating valve has an open or withdrawn position and a closed (or partially closed) or extended position relative to the venturi. When the modulating valve is in the open position, a predetermined maximum bypass flow is allowed through the venturi. If this maximum bypass is exceeded due to the pig stalling, the valve substantially instantly moves to the closed position. The closed position allows a predetermined minimum bypass flow through the venturi in order to substantially immediately start the pig moving again before significant pressure builds up behind the pig. The valve then substantially instantly moves to the open position. This prevents the pig from surging to speeds higher than the average fluid flow.

The predetermined maximum bypass flow may result in a speed reduction of the pipeline pig to a relatively small percentage of the average fluid flow velocity in the pipeline. Larger body pigs are likely to have greater speed reduction possibility than smaller body pigs. The predetermined minimum bypass flow may be set to cause an acceleration of the pig to a speed below that of the average fluid flow.

The modulating valve may be a poppet-style valve having a compression or tension spring, a plate, and an insert. The plate and the insert each has a plurality of ports that allow bypass flow through the plate and insert, respectively. The face of the plate may be substantially flat or substantially the same shape as an interior surface of the venturi. When the valve is closing, the plate extends toward the inlet side of the venturi to reduce bypass flow to the minimum bypass flow.

The modulating valve may also be a frusto-conical shaped valve or stopper. The stopper has sufficient mass to overcome the spring force holding the modulating valve in its open position. When the pipeline pig stalls, the valve closes and the stopper chokes bypass flow through the venturi to the predetermined minimum bypass flow. The peripheral surface of the stopper preferably has substantially the same shape as the interior surface of the venturi. When the pig starts running again, the valve opens as inertia forces the stopper away from the inlet side of the venturi. The use of a mass damper device may also minimize any "bouncing" effect of the stopper.

A better understanding of the invention will be obtained from the following detailed description of the preferred embodiments taken in conjunction with the drawings and the attached claims.

DETAILED DESCRIPTION OF THE PREFERRED EMBODIMENTS

Preferred embodiments of a speed regulated pipeline pig will now be described by making reference to the drawings and the following elements illustrated in the drawings:

| | |
|---|---|
| 10 | Pipeline pig |
| 12 | Body |
| 14 | Forward end |
| 16 | Rearward end |
| 18 | Passageway |
| 20 | Forward sealing cups |
| 22 | Perforation |
| 24 | Rearward sealing cups |
| 30 | Nozzle |
| 32 | Insert |
| 34 | Venturi |
| 36 | Inlet side |
| 38 | Discharge side |
| 40 | Interior surface |
| 50 | Modulating valve |
| 52 | Insert |
| 54 | Port |

| | |
|---|---|
| 56 | Plunger |
| 58 | Tension spring |
| 60 | Head |
| 62 | Plate |
| 64 | Port |
| 70 | Modulating valve |
| 72 | Insert |
| 74 | Port |
| 76 | Plunger |
| 78 | Compression spring |
| 80 | Head |
| 82 | Plate |
| 84 | Port |
| 86 | Angular surface |
| 88 | Arcuate surface |
| 130 | Pipeline pig |
| 132 | Body |
| 134 | Forward end |
| 136 | Rearward end |
| 138 | Passageway |
| 140 | Rearward sealing discs |
| 142 | Forward sealing discs |
| 150 | Modulating valve |
| 152 | Bracket |
| 154 | Bracket |
| 156 | Housing |
| 158 | Spring |
| 160 | Plunger |
| 162 | Valve head |
| 164 | Venturi |
| 166 | Inlet side |
| 168 | Split collar |
| 170 | Pin |
| 172 | Bolt |
| 174 | Set screw |
| 176 | Capture nut |
| 178 | Bolt |

Figure 1:
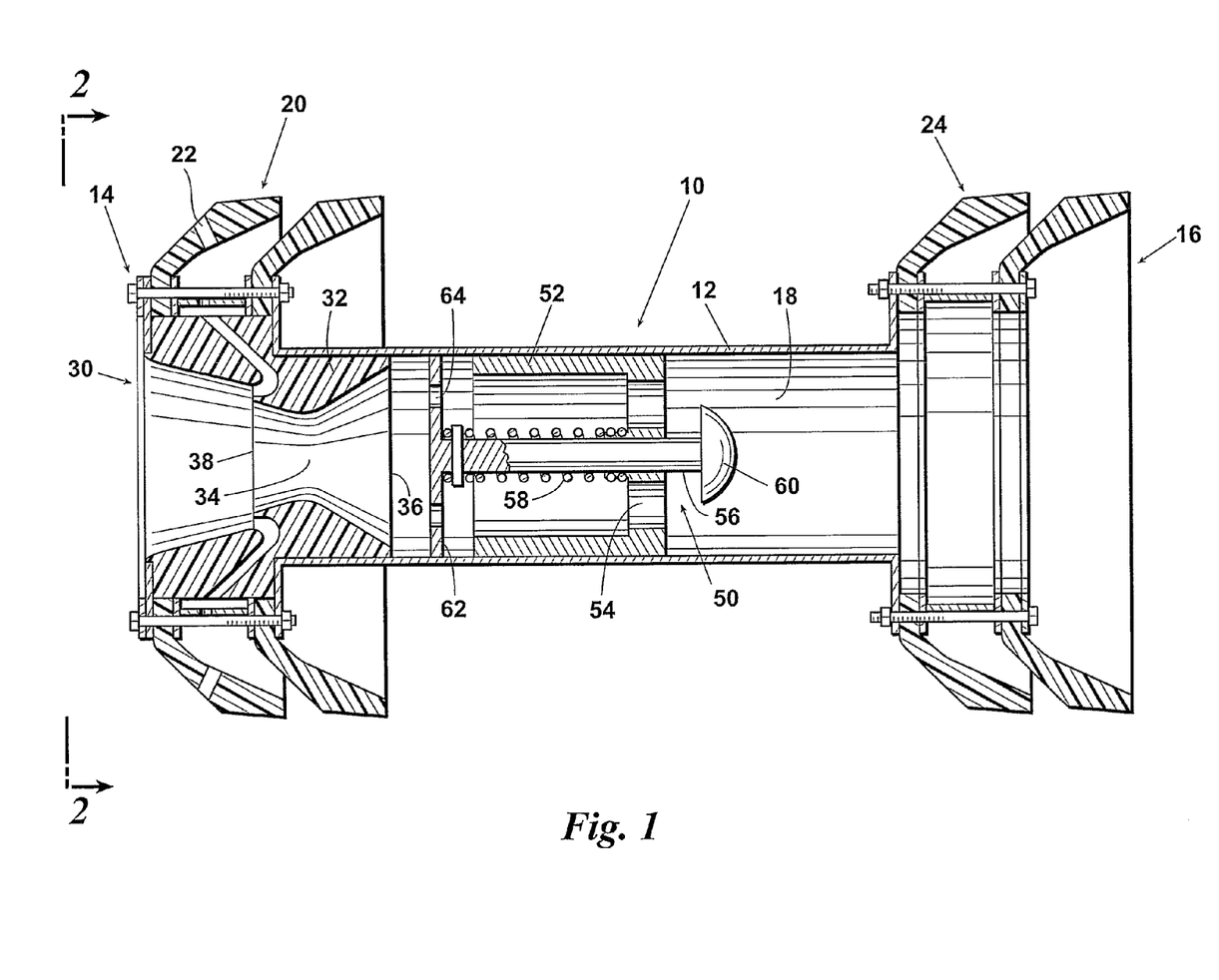
FIG. 1 is a cross-sectional view of a small body pipeline pig having a modulating valve for regulating the speed of the pig. The modulating valve includes a plate having an array of ports and a tension spring. The valve is biased in the open position to allow a predetermined maximum discharge rate of flow through the nozzle located at the front of the pig.
Figure 2:
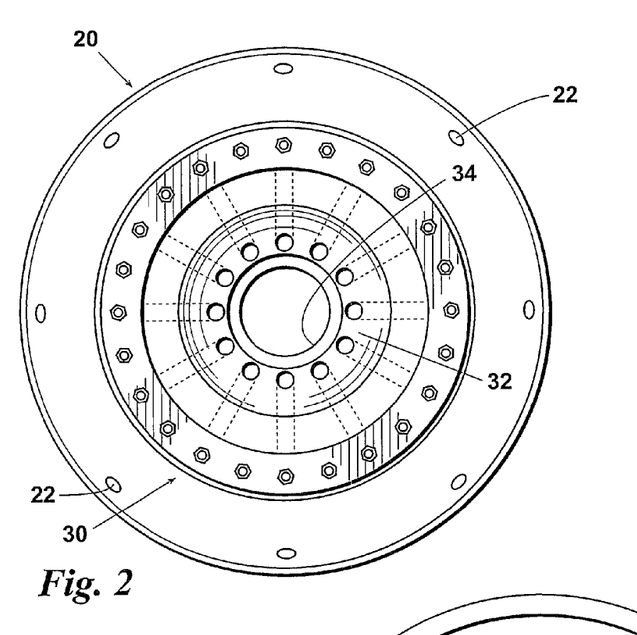
FIG. 2 is a view of the pipeline pig of FIG. 1 taken along section line 2-2.
Figure 3:
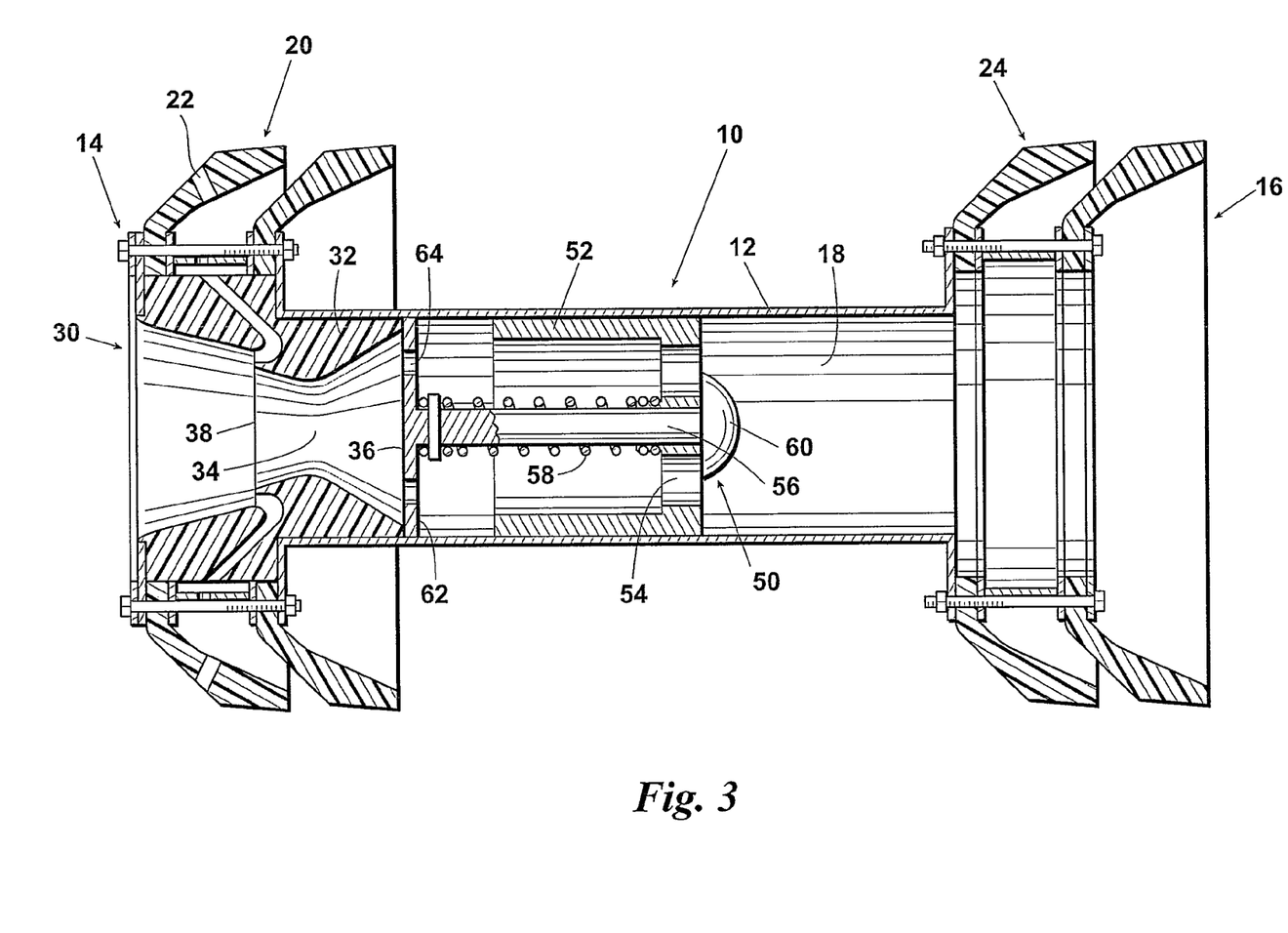
FIG. 3 is a cross-sectional view of the pipeline pig illustrating the modulating valve with tension spring in its closed position. The closing of the valve reduces the amount of bypass flow through the pig, which allows differential pressure across the pig to increase, which in turn causes the pig to move forward.

Referring to the drawings, and first to FIGS. 1 to 3, a pipeline pig 10 having a longitudinal, cylindrical body 12 has a forward end 14, a rearward end 16, and a passageway 18 therethrough. Mounted at forward end 14 and rearward end 16 are driving cups 20 and 24, respectively. Driving cups 20 and 24 are of a type well-known in the art and provide sealing engagement with the inner wall surface of the pipeline in order to propel pig 10 forward under differential fluid pressure. At least one of the forward cups 20 is preferably perforated. The size and number of perforations 22 in forward cup 20 is determined by such factors as pipeline size, pressure, and flow availability. The use perforated sealing cups in combination with nozzle porting in a dispersal-type pig is described in U.S. patent application Ser. No. 12/028,078, "Vortex Inhibitor Dispersal Pig," which is hereby incorporated by reference.

A ported nozzle 30 is mounted at forward end 14. Nozzle 30 includes an insert 32 forming a venturi 34. Venturi 34 has an inlet side 36 and an outlet side 38 and, in some instances, preferably has a short steep profile as opposed to a long shallow tapered profile. Because of the large volume of bypass through nozzle 30 coupled with an increase of friction on the pig, pig 10 may stall. An anti-stalling feature, therefore, is provided.

A modulating valve 50 prevents stalling and regulates the speed of pig 10 by regulating bypass flow. Although modulating valve 50 and venturi 34 are shown concentric to body 12, either or both may be oriented off-center and one or more valve 50 and venturi 34 combinations may be employed. Valve 50, which is located rearward of the inlet side 36 of the venturi 34, is preferably a poppet-type valve that includes a valve head 60, plunger 56, tension spring 58, and a cylindrical-shaped valve body insert 52 having one or more ports 54. A plate 62 is attached to the end of plunger 56 to regulate bypass flow.

Plate 62 includes one or more ports 64. By altering the distance between plate 62 and venturi 34, plate 62 regulates bypass flow through nozzle 30. Valve 50 is biased in an open position by tension spring 58 to allow a predetermined maximum bypass flow through nozzle 30, thereby regulating the speed of pig 10. In this preferred embodiment and other preferred embodiments disclosed herein, the predetermined maximum bypass flow may result in a speed reduction of the pipeline pig to a relatively small percentage of the average fluid flow velocity in the pipeline. For example, depending on factors that include the size of the pig and the average flow rate of the pipeline, the speed reduction achieved may result in a pig traveling at a speed of as little as 10% of the average flow rate of the pipeline (a 90% speed reduction). Other applications may result in the pig travelling at a speed of as much as 70% of the average flow rate of the pipeline (a 30% speed reduction).

When the maximum bypass flow is exceeded, due to pig 10 stalling, plate 62 instantly extends toward inlet side 36 (see FIG. 3) to reduce bypass flow through nozzle 30 to a predetermined minimum bypass flow. The minimum bypass flow is intended to start pig 10 moving again before significant pressure builds up behind pig 10 in a compressible fluid. If the friction of pig 10 increases somewhat due to changes in the internal diameter of the pipeline or the accumulation of debris, airflow across plunger 56 increases creating drag sufficient to partially overcome the spring force. Plate 62, therefore, will tend to close slightly as flow rate through venturi 34 increases, thereby creating more driving pressure drop across pig 10 and keeping pig 10 moving at a desirable rate of travel.

Figure 4:
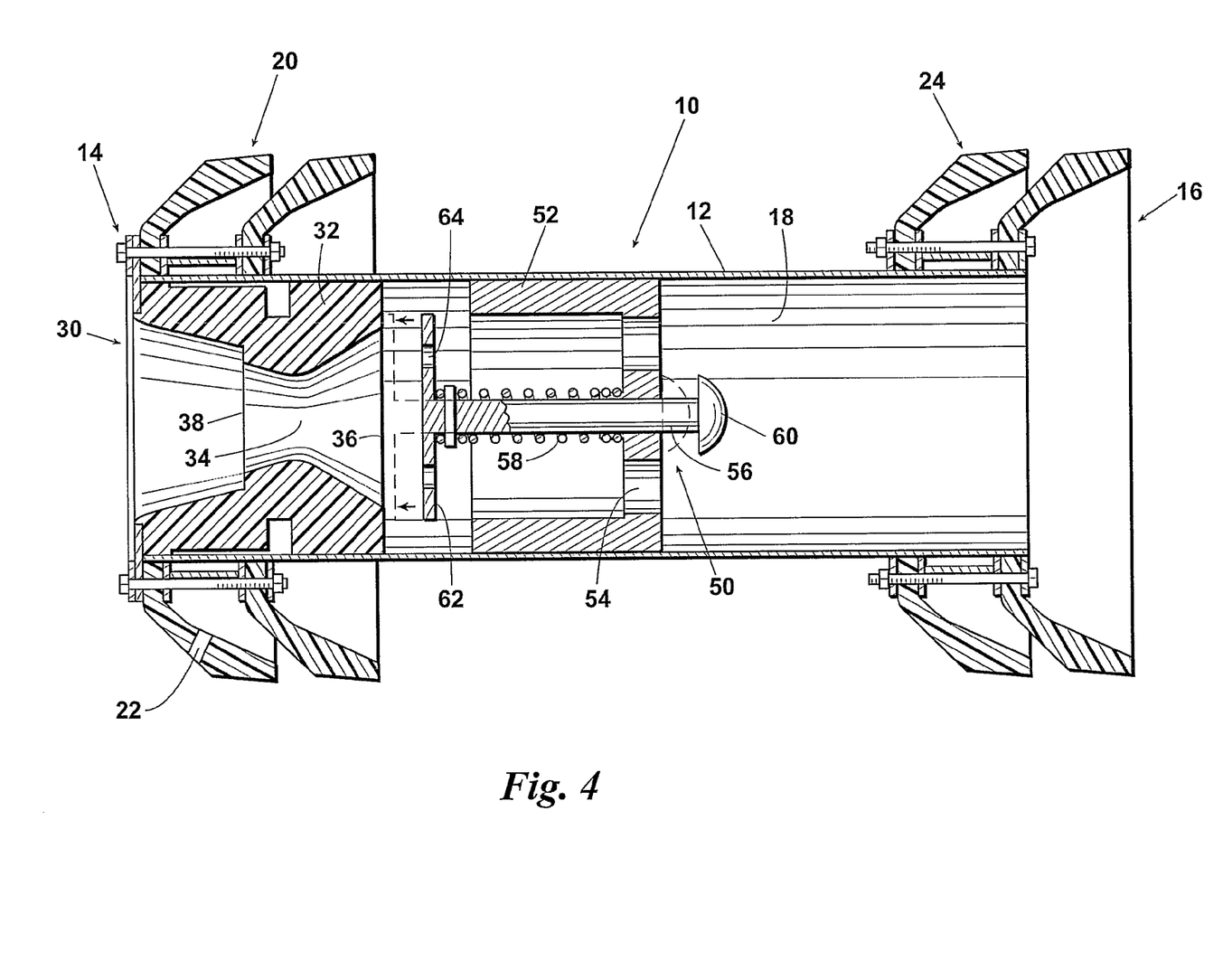
FIG. 4 is a cross-sectional view of a large body pipeline pig having a modulating valve in the open position and having a tension spring.

Referring now to FIG. 4, a pig 10 having a large body 12 includes a ported nozzle 30 at its forward end 14 and a modulating valve 50 located rearward of the inlet side 36 of venturi 34. At least one of the forward cups 20 preferably has a number of perforations 22 but in some instances the perforations 22 are limited to the bottom half of the cup 20. In these instances, pig 10 includes a counterweight (not shown) so that the perforated lower portion of cup 20 remains oriented within the lower bottom half of the pipeline.

The diameter of plate 62 is substantially smaller than passageway 18 but slightly larger than the diameter of the inlet 36. Valve 50 is again biased in an open position by a tension spring 58 to allow a predetermined maximum by pass flow through nozzle 30. When the maximum bypass flow is exceeded, plate 62 instantly moves toward inlet side 36 to reduce bypass flow through nozzle 30 to a predetermined minimum bypass flow.

Figure 5:
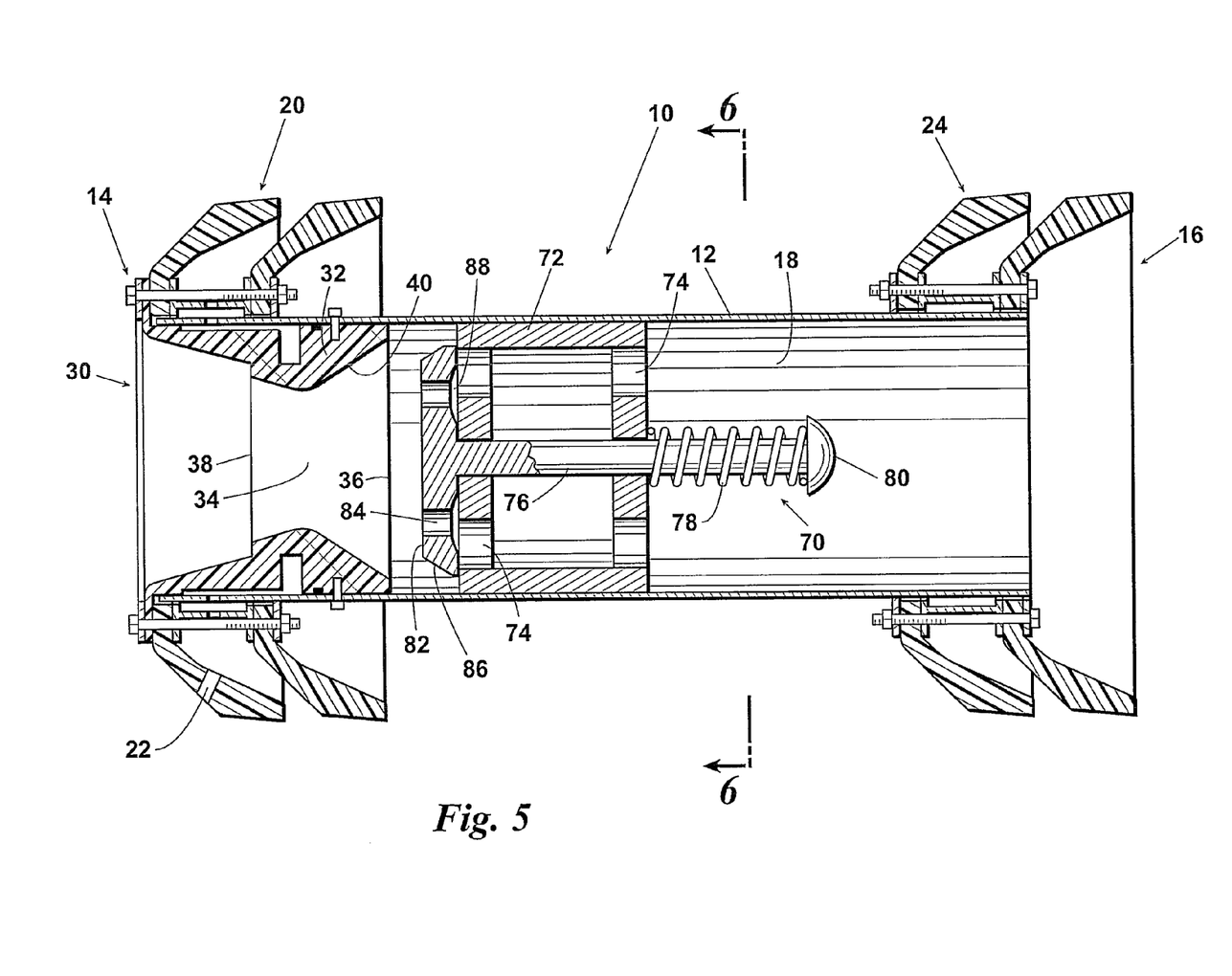
FIG. 5 is a cross sectional-view of the pipeline pig with the modulating valve in its open position and having a compression spring.
Figure 6:
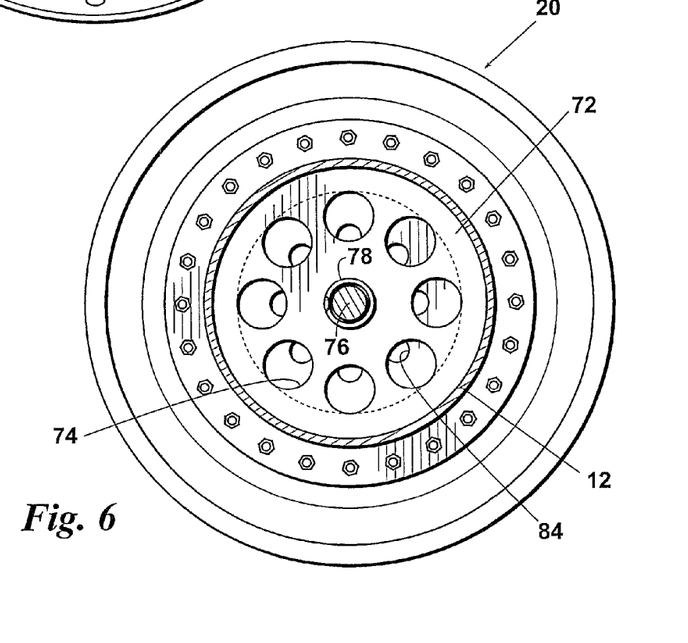
FIG. 6 is a view of the pipeline pig of FIG. 5 taken along section line 6-6. An array of ports is arranged about the surface of the valve plate.
Figure 7:
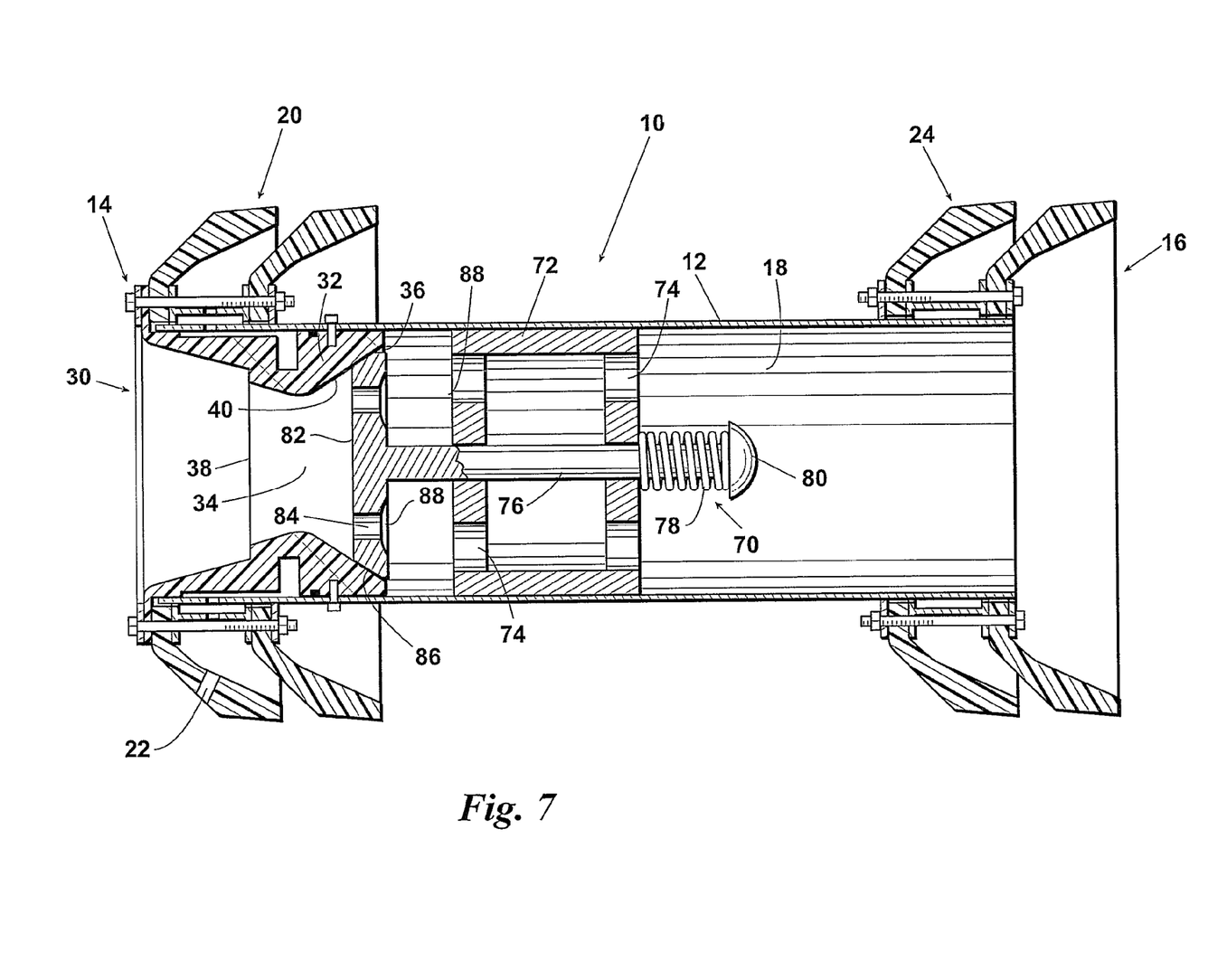
FIG. 7 is a cross-sectional view of the pipeline pig with the modulating valve in its closed position and having a compression spring.

Referring now to FIGS. 5 to 7, a pig 10 having a large body 12 includes a ported nozzle 30 at its forward end 14 and a modulating valve 70 located rearward of the inlet side 36 of the nozzle venturi 34. Similar to other preferred embodiments described herein, either or both modulating valve 70 and venturi 34 may be oriented off-center and one or more valve 70 and venturi 34 combinations may be employed. In some instances, venturi 34 preferably has a short steep profile as opposed to a long shallow tapered profile. Forward cup 20 may have a number of perforations 22 through its lower half and, in those instances, pig 10 includes a counterweight (not shown) so that the perforated lower portion of cup 20 remains oriented within the lower bottom half of the pipeline.

Modulating valve 70 is preferably a poppet-type valve and includes a valve body insert 72 having an array of ports 74. Valve 70 is biased in an open or withdrawn position relative to the inlet side 36 of the venturi 34 by a compression spring 78. The amount of bias provides for a predetermined maximum bypass flow through nozzle 30. When the maximum bypass flow is exceeded, plate 82 instantly extends to an interior portion of nozzle 30 to reduce bypass flow to a predetermined minimum bypass flow.

Plate 82 includes an array of ports 84, an arcuate-shaped rear surface portion 88, and angular-shaped peripheral surface 86. Surface 86 substantially matches the angular profile of interior surface 40 of nozzle insert 32. When valve 70 is in its closed or extended position, surface 86 substantially mates with surface 40 (see FIG. 7), thereby reducing bypass flow through nozzle 30 to the predetermined minimum bypass flow. Modulating valve 70, as well as modulating valve 50, is not limited in application to dispersal pigs but may be applied in other types of pigs as well, including cleaning pigs.

Figure 8:
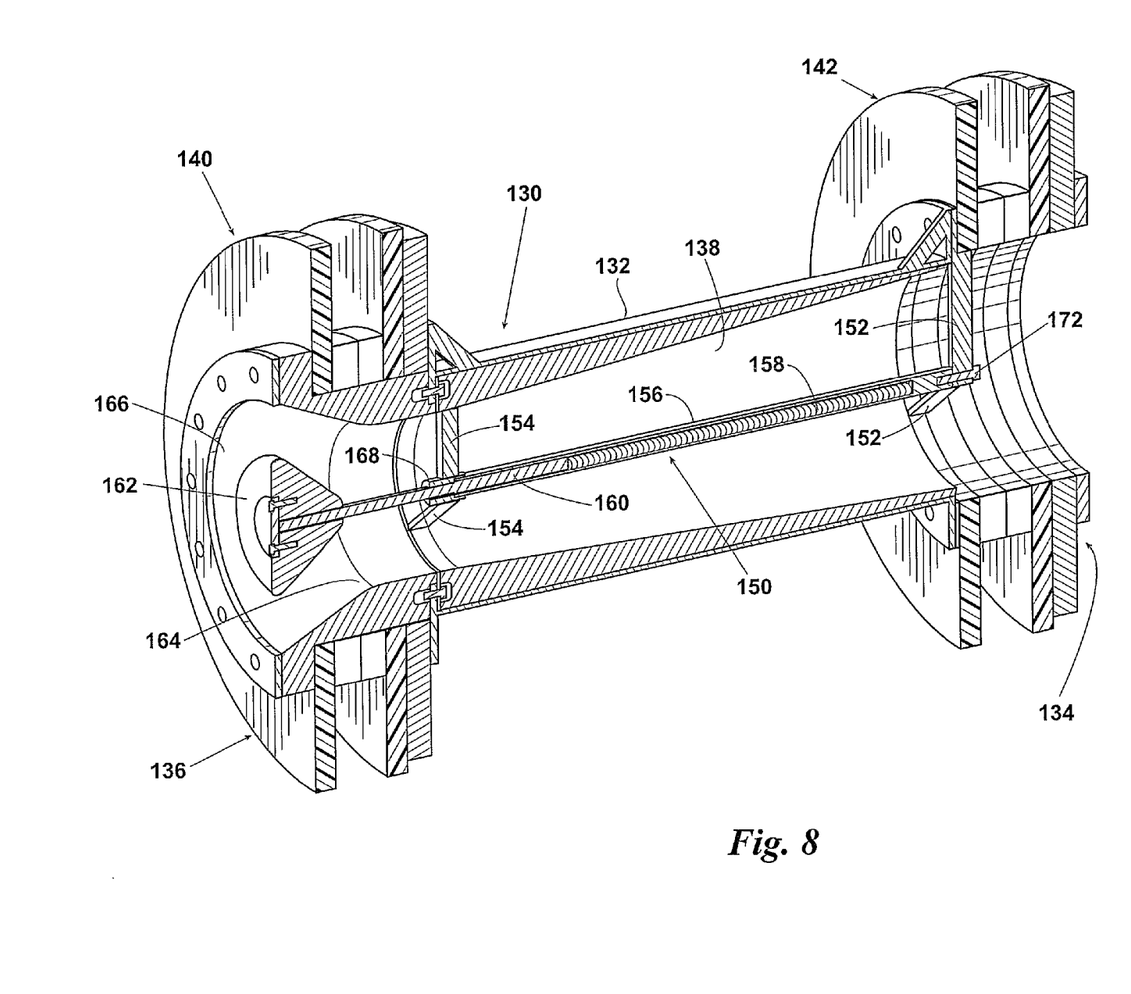
FIG. 8 is an isometric cross-sectional view of a pipeline pig having a modulating valve in the form of a frustoconical-shaped valve located at the rearward portion of the pig. The valve, which is shown in its open position, is configured to allow a predetermined amount of bypass flow and, therefore, pig speed. A spring holds the valve in the open position.
Figure 9:
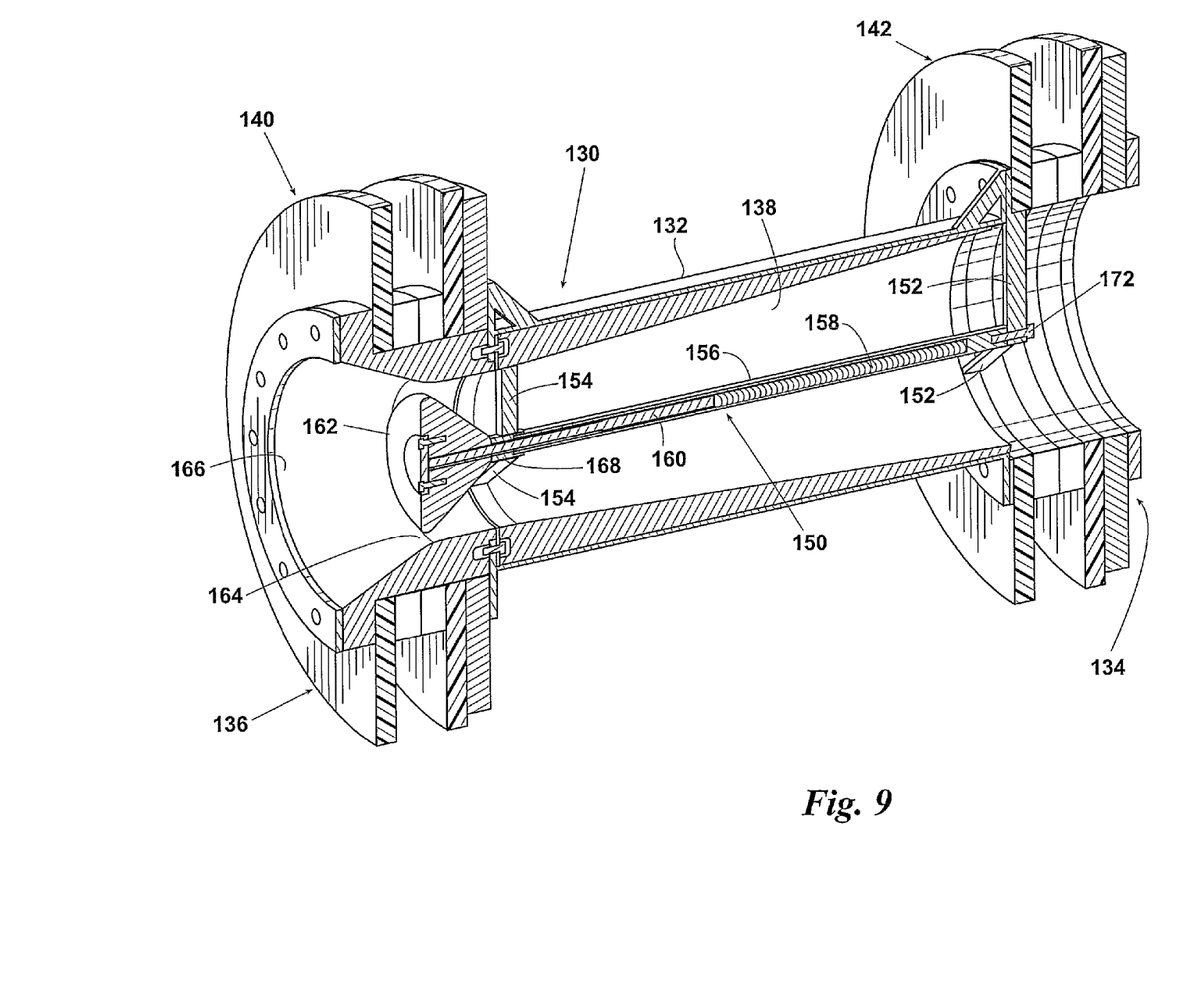
FIG. 9 is a view of the pig with the modulating valve in its closed position. As the pig suddenly slows, inertia forces the valve to immediately close, thereby choking bypass flow through the pig and causing pressure buildup behind the pig. As the pig immediately begins to accelerate, inertia forces the valve to the open position. In this manner, a maximum speed of the pig is controlled and the pig is prevented from stalling.

Referring now to FIGS. 8 and 9, a pipeline pig 130 having a longitudinal, cylindrical body 132 has a forward end 134, a rearward end 136, and a venturi-shaped passageway 138 therethrough. A set of radial discs 140 and 142 provide sealing engagement with the inner wall surface of the pipeline in order to propel pig 130 forward under differential fluid pressure. The venturi-shaped centralized bypass 138 increases the amount of bypass flow though the pig, which helps minimize the pressure drop across the pig 130 and thus maximize the reduction in traveling speed of pig 130 in high velocity flow pipelines. Venturi 164 preferably has a long shallow taper toward front end 134 in order to avoid turbulence and thus improve the efficiency of bypass flow. Minimizing the pressure drop, however, increases the likelihood of stalling should pig 130 encounter some higher friction portions of the pipeline such as increased wall thickness, bends, or accumulated debris at the forward end 134 of pig 130. An anti-stalling feature, therefore, is required.

Modulating valve 150 prevents stalling and regulates the bypass flow through pig 10. In a preferred embodiment, valve 150 includes a frustoconical-shaped stopper 162 that is attached to a plunger 160 and held in an open position at rearward end 136 by spring 158. The stopper 162 has sufficient mass and/or aerodynamic drag to overcome the spring force of spring 158 holding valve 150 in the open position. Spring 158 is contained within a hollow valve stem housing 156. Spring 158 may be a single spring or a set of springs. Housing 156 is oriented coaxial to the central longitudinal axis of pig body 132 and is received and supported by spoke-shaped brackets 152 and 154. A split collar 168 prevents plunger 160 from being pushed out of housing 156 by spring 158. At forward end 134, bolt 172 serves as a stop for plunger 160.

Valve 150 uses a combination of mass/inertia and increased flow rate during stalling to ensure that stopper 162 chokes down instantly upon sudden stalling of pig 130, thus starting pig 130 instantly moving again before significant pressure builds up behind pig 130. The ability of stopper 162 to instantly open again, due to inertia, when pig 130 surges forward minimizes the tendency of pig 130 to surge to speeds even higher than the average fluid flow velocity in the pipeline.

In a preferred embodiment, spring 158 holds stopper 162 in a withdrawn or open position relative to the inlet side 166 of venturi 164, thereby allowing a predetermined maximum bypass flow through venturi 164. Immediately upon pig 10 stalling, stopper 162 does not close completely but reduces the bypass flow area through venturi 164 to a predetermined minimum bypass flow to ensure that the pig will start and run. Similar to other embodiments of the modulating valve, if the friction of pig 130 increases somewhat due to changes in the internal diameter of the pipeline or the accumulation of debris, stopper 162 will tend to close slightly as flow rate through venturi 164 increases, thereby creating more driving pressure drop across pig 130 and keeping pig 130 moving at a desirable rate of travel.

In a cleaning pig application, this minimum bypass area will still allow flow through pig 130 which will tend to clear away any forward debris and allow pig 130 to start running again. In a dispersal pig application, the venturi-shaped bypass 164 will create smooth, high velocity flow which maximizes the suction vacuum and energy of the gas/liquid mixture being sprayed out the front of a nozzle while functioning as previously described to minimize velocity, stalling, and surging of pig 130.

Figure 10:
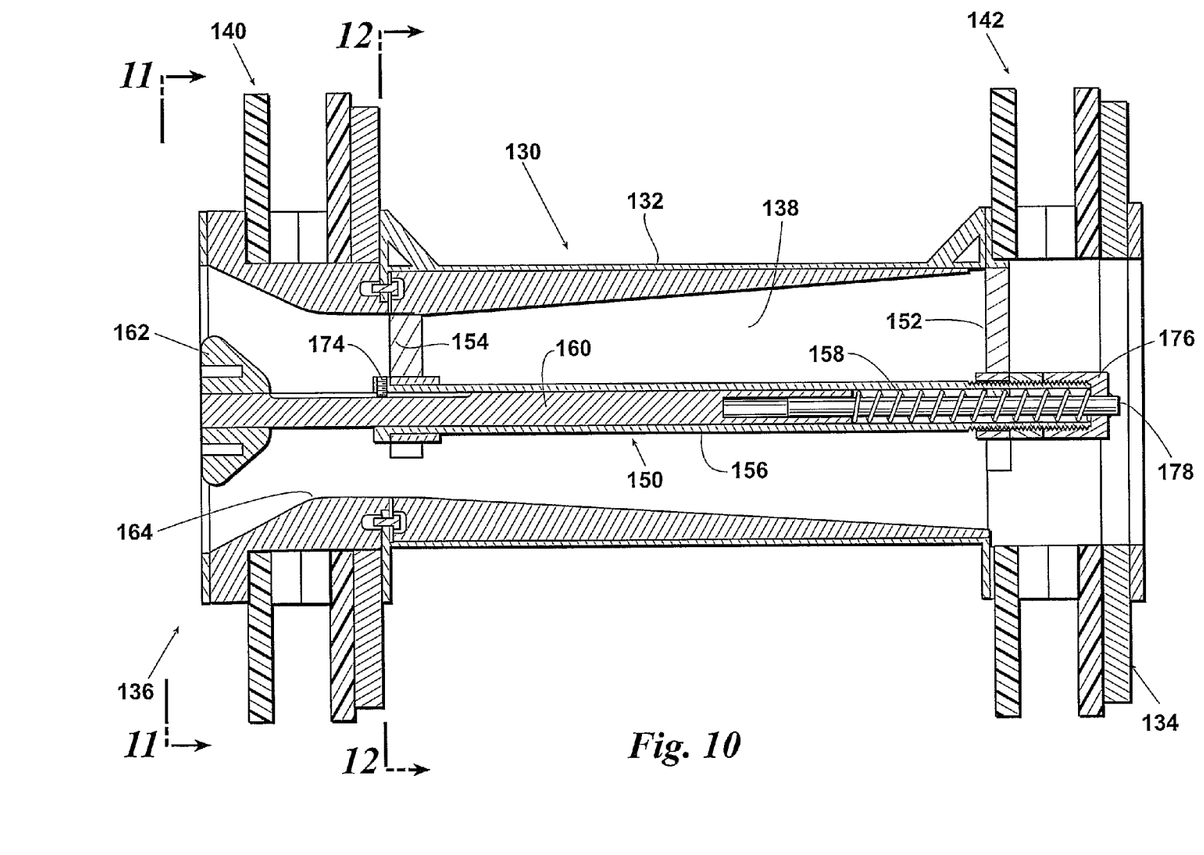
FIG. 10 is a cross-sectional view of a pig having an alternate embodiment of the plunger and spring arrangement for the frusto-conical shaped modulating valve. A set screw captures the plunger and a capture nut and bolt stop spring travel as the spring urges the plunger toward the rearward end of the pig.
Figure 11:
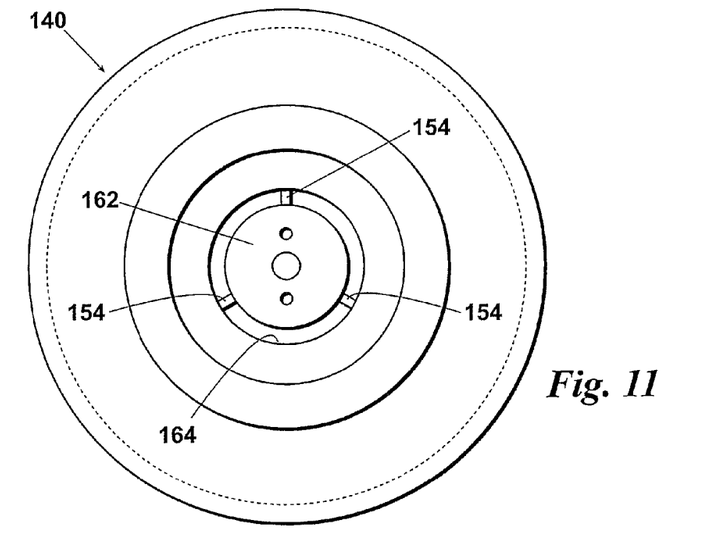
FIG. 11 is a view of the pig and modulating valve taken along section line 11-11 of FIG. 10.
Figure 12:
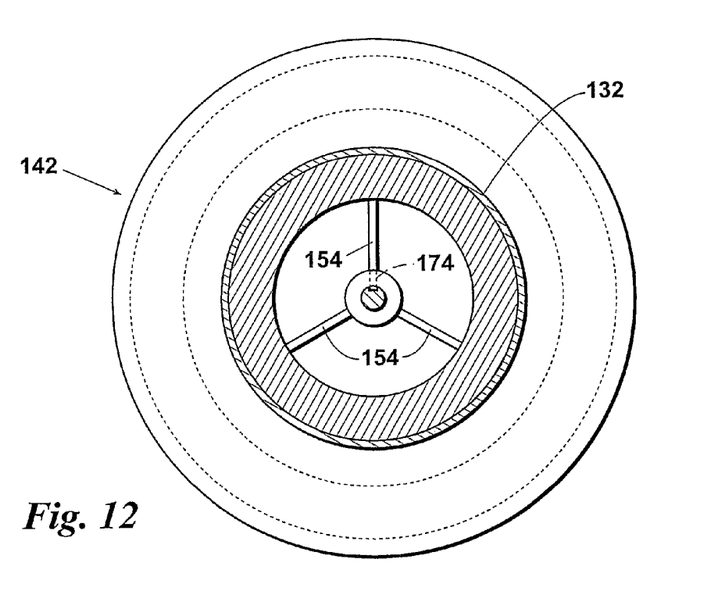
FIG. 12 is a view of the pig and modulating valve taken along section line 12-12 of FIG. 10.

FIGS. 10 to 14 illustrate other preferred embodiments of modulating valve 150 and for retaining modulating valve 150 within housing 156. Similar to other embodiments disclosed herein, valve 150 and venturi 164 may be oriented off-center and one or more valve 150 and venturi 164 combinations may be employed. Referring to FIGS. 10 to 12, housing 156 is threaded to bracket 152. A set screw 174 captures plunger 160. Spring 158 is then loaded into housing 156 and a capture nut 176 is attached to housing 156. A bolt 178 is threaded through a clearance hole in capture nut 176 and into a threaded hole in plunger 160. As the spring 158 urges plunger 160 toward rearward end 136, the head of bolt 178 stops the travel of plunger 160. This design allows for incorporating a damper (not shown) into the design should it become necessary to control the speed at which stopper valve 162 returns to its starting position after being actuated. In addition to damping, other ways to adjust the response of valve 162, as well as the response of other preferred embodiments of the modulating valve disclosed herein, include varying the preload on the spring or changing to a different spring.

Figure 13:
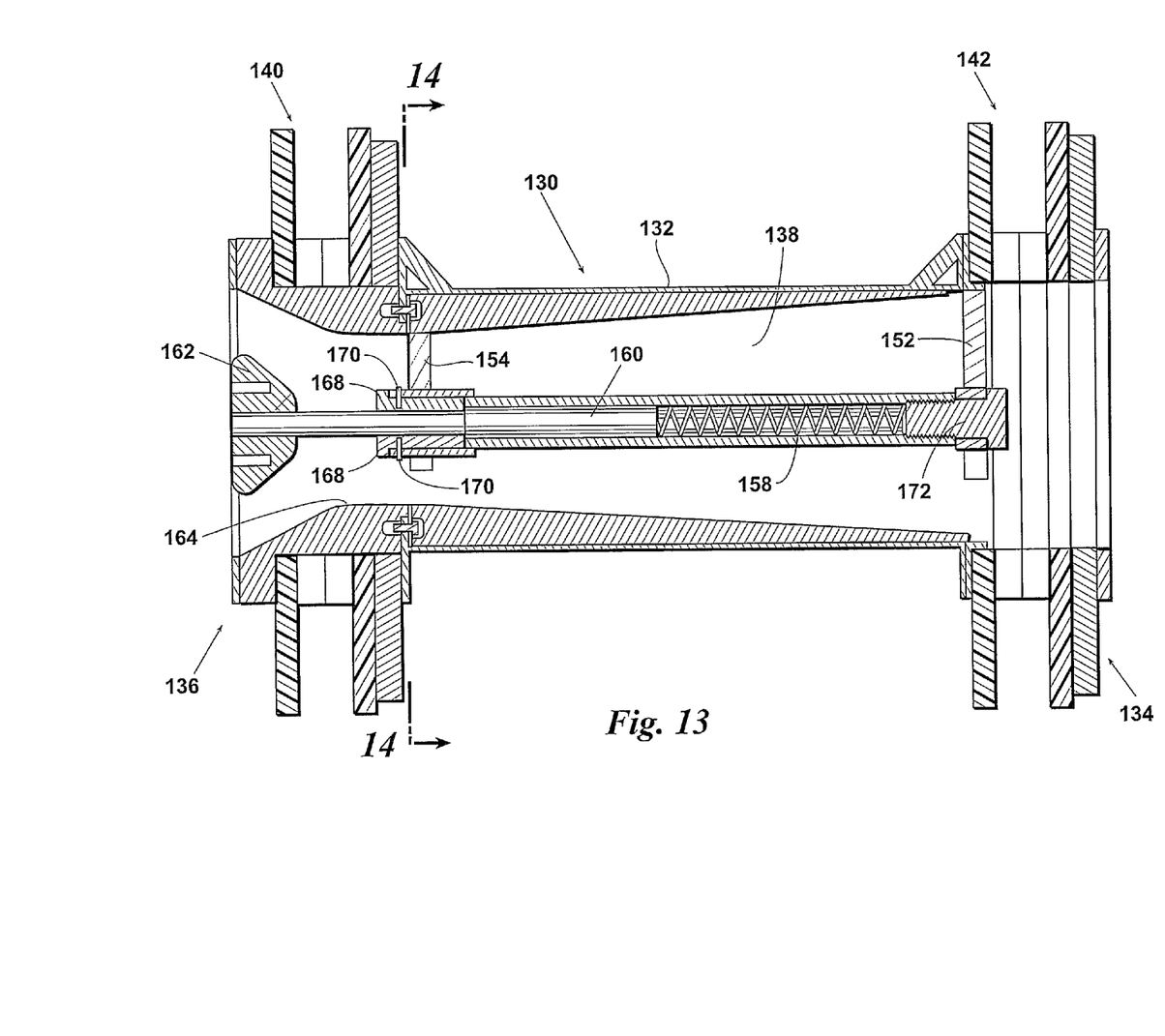
FIG. 13 is a cross-sectional view of a pig having another alternate embodiment of the plunger and spring arrangement. The plunger has a stepped shape that a split collar encircles. The split collar is then pinned to prevent the plunger from being pushed out of the plunger tube by the spring.
Figure 14:
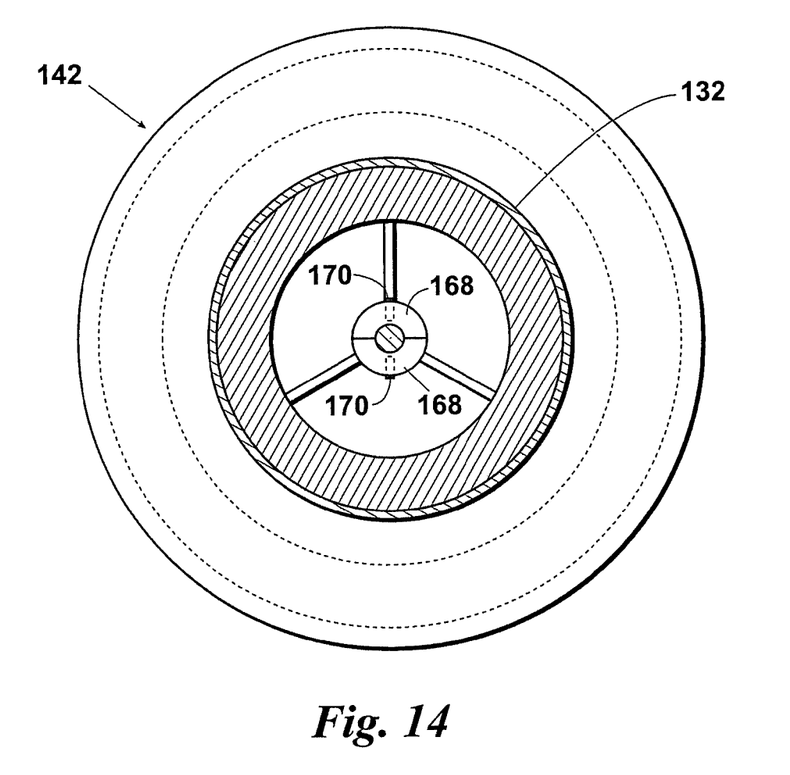
FIG. 14 is a view of the pig and modulating valve taken along section line 14-14 of FIG. 13.

As illustrated by FIGS. 13 and 14, in another preferred embodiment of valve 150 plunger 160 has a step-shape. A split collar 168 encircles plunger 160 and is pinned by pins 170 to a flange portion of bracket 154. Bolt 172 threads into housing 156 to locate housing 156 within pig body 130. Stopper valve 162 is then attached to plunger 160.

While a speed regulated pig has been described with a certain degree of particularity, many changes may be made in the details of construction and the arrangement of components without departing from the spirit and scope of this disclosure. A speed regulated pig according to this disclosure, therefore, is limited only by the scope of the attached claims, including the full range of equivalency to which each element thereof is entitled.

What is claimed is:

1. A pipeline pig comprising:
   a longitudinal pig body having a single bypass flow passageway, and a plurality of external circumferential sealing elements, said bypass flow passageway having a venturi located toward a rearward end of the longitudinal pig body; and
   a modulating valve located within said single bypass flow passageway and between an inlet side and an outlet side of said venturi;
   said modulating valve having a first position and a second position, said first position allowing a predetermined maximum bypass flow past said modulating valve, said second position allowing a predetermined minimum bypass flow past said modulating valve, wherein the predetermined maximum and minimum bypass flows flow in a same direction as the main product flow propelling said pipeline pig forward under differential fluid pressure when in a pipeline;
   whereby said modulating valve moves to said second position substantially instantaneously upon said pipeline pig stalling and from said second position toward said first position substantially instantaneously upon said pipeline pig accelerating.

2. A pipeline pig according to claim 1, said modulating valve having at least one of sufficient mass and aerodynamic drag to overcome a force holding said modulating valve in said first position when said pipeline pig stalls.

3. A pipeline pig according to claim 1 wherein the predetermined maximum bypass flow is effective for causing a speed reduction of said pipeline pig below that of an average speed of a pipeline product flow.

4. A pipeline pig according to claim 3 wherein the speed reduction is in a range of 30% to 90% of the average speed of the pipeline product flow.

5. A pipeline pig according to claim 1 wherein the predetermined minimum bypass flow is effective for causing an acceleration of said pig to a speed below that of an average speed of a pipeline product flow.

6. A pipeline pig according to claim 1 further comprising said modulating valve being capable of having one or more intermediate positions located between said first and second positions.

7. A pipeline pig according to claim 1 further comprising a means for adjusting a response of said modulating valve.

8. A pipeline pig according to claim 1 further comprising a peripheral surface of said modulating valve having substantially the same shape as a portion of an interior surface of said venturi.

9. A pipeline pig according to claim 1 further comprising said modulating valve being a poppet-style valve.

10. A pipeline pig according to claim 9, said modulating valve further comprising a plate, a face of said plate being substantially flat and having at least one port therethrough.

11. A pipeline pig according to claim 9, said modulating valve further comprising an insert, said insert having at least one port therethrough.

12. A pipeline pig according to claim 1 further comprising said modulating valve being a frusto-conical shaped valve.

13. A pipeline pig according to claim 12 wherein said modulating valve in the first position allows full flow through and efficiency of said venturi.

14. A pipeline pig according to claim 1, said modulating valve further comprising a spring, said spring being at least one of a compression spring and a tension spring.

15. A pipeline pig according to claim 1 further comprising at least one of said modulating valve and said venturi being concentric to said pig body.

16. A pipeline pig having a longitudinally extending cylindrical-shaped body with a bypass flow passageway having a venturi located toward its rearward end, the bypass flow passageway and the venturi each being arranged to receive a main pipeline product flow which bypasses exterior sealing means located on the cylindrical-shaped body, the bypass flow passageway housing a modulating valve located between an inlet side and an outlet side of the venturi, the modulating valve and venturi each being tapered but having a different taper than the other, the modulating valve moving between a first position and a second position, the first and second positions each permitting a bypass flow past the modulating valve, all bypass flow flowing past the modulating valve being in a same direction as the main product flow.

* * * * *